(12) United States Patent
Kurosawa

(10) Patent No.: US 7,461,517 B2
(45) Date of Patent: Dec. 9, 2008

(54) REFRIGERANT CYCLE UNIT

(75) Inventor: Yoshiaki Kurosawa, Saitama (JP)

(73) Assignee: Sanyo Electric Co., Ltd., Osaka (JP)

( * ) Notice: Subject to any disclaimer, the term of this patent is extended or adjusted under 35 U.S.C. 154(b) by 219 days.

(21) Appl. No.: 11/363,191

(22) Filed: Feb. 28, 2006

(65) Prior Publication Data

US 2006/0191280 A1    Aug. 31, 2006

(30) Foreign Application Priority Data

Feb. 28, 2005    (JP)    ............................. 2005-054652
Feb. 28, 2005    (JP)    ............................. 2005-054658

(51) Int. Cl.
F25B 13/00    (2006.01)

(52) U.S. Cl. ...................... 62/324.1; 62/498

(58) Field of Classification Search ............... 62/324.1, 62/160, 239, 154, 324.6, 498, 501, 505, 512
See application file for complete search history.

(56) References Cited

U.S. PATENT DOCUMENTS

| | | | |
|---|---|---|---|
| 5,299,431 A * | 4/1994 | Iritani et al. | ................... 62/243 |
| 5,301,515 A | 4/1994 | Iritani et al. | |
| 5,388,421 A * | 2/1995 | Matsuoka | ..................... 62/209 |
| 5,598,887 A | 2/1997 | Ikeda et al. | |
| 2001/0003311 A1 | 6/2001 | Karl | |
| 2004/0129012 A1 | 7/2004 | Feuerecker | |
| 2004/0134217 A1 | 7/2004 | Itoh et al. | |

FOREIGN PATENT DOCUMENTS

| | | |
|---|---|---|
| DE | 10163 607 | 7/2003 |
| EP | 0 681 933 | 11/1995 |
| EP | 1 262 347 | 12/2002 |
| EP | 1 568 952 | 8/2005 |
| JP | 06-206438 | 7/1994 |
| JP | 7-8018 | 2/1995 |
| JP | 07-232547 A | 9/1995 |
| JP | 10-264647 | 10/1998 |
| JP | 11-118265 | 4/1999 |
| JP | 11-159911 | 6/1999 |
| JP | 2002-19443 A | 1/2002 |
| JP | 2004189069 | 7/2004 |
| JP | 2004-239453 | 8/2004 |
| JP | 2004-270999 | 9/2004 |
| WO | WO 03/064193 | 8/2003 |
| WO | WO 2004/040208 A1 | 5/2004 |

OTHER PUBLICATIONS

Japanese Office Action issued in corresponding Japanese Patent Application No. JP 2005-054652, dated Apr. 16, 2007.

* cited by examiner

*Primary Examiner*—Melvin Jones
(74) *Attorney, Agent, or Firm*—McDermott Will & Emery LLP

(57) ABSTRACT

A refrigerant cycle unit having a side heat exchanger for dehumidifying a space, and a heating mode for delivering a refrigerant from a compressor into an internal gas cooler. The refrigerant cycle unit further includes a cooling mode delivering the refrigerant from the compressor into the external heat exchanger, and after being decompressed by the compressor flowing the refrigerant into an evaporator and into the internal gas cooler. The refrigerant flows into the evaporator, and the decompressed refrigerant flows into the external heat exchanger and the two refrigerants are discharged from the evaporator and the external heat exchanger, respectively, and are united together and returned to the compressor.

2 Claims, 6 Drawing Sheets

HEATING OPERATION

COOLING OPERATION

DEHUMIDIFYING HEATING OPERATION

IN HEATING OPERATION

IN COOLING OPERATION

REFRIGERANT CYCLE UNIT

BACKGROUND OF THE INVENTION

The present invention relates to a refrigerant cycle unit for air-conditioning and dehumidifying a space to be air-conditioned by causing a refrigerant to give off heat or absorb heat in a utilizing side heat exchanger arranged to be capable of heat exchanging with the space to be air-conditioned.

Heretofore, as shown in FIG. 11 a refrigerant cycle unit of this kind, for example, a car air-conditioner for air-conditioning and dehumidifying the interior of an automobile includes a refrigerant circuit comprising a compressor 204, a utilizing side heat exchanger 201 arranged to be capable of heat exchanging with the interior of a car as an air-conditioned space, a heat source side heat exchanger 203 arranged outside the interior of the car, flow regulating valves 211, 212 and 213, and the like.

As shown in FIG. 12, the utilizing side heat exchanger 201 is formed with blow-off openings 200A directing into three directions of lower foot Fo, front face Fa and glass surfaces De such as a windshield (not shown in FIG. 11) and is arranged in a storage room 200 provided to be capable of heat exchanging with the interior of the car. Arranged on the opposite side from the blow-off openings 200A with respect to a utilizing side heat exchanger 201 in the storage room 200 is a blower 210 for feeding the air in the interior of the car to the utilizing side heat exchanger 201 and further feeding the air which has been heat exchanged with a refrigerant in the utilizing side heat exchanger 201 through the blow-off openings 200A into the interior of the car.

The utilizing side heat exchanger 201 comprises an internal gas cooler 202 for causing the refrigerant compressed in the compressor 204 to give off heat, and an evaporator 209 for causing the refrigerant decompressed in a flow regulating valve 212 to absorb heat. The internal gas cooler 202 is arranged on the side of the blow-off openings 200A in the storage room, while the evaporator 209 is on the side of the blower 210. Arranged on the rear side of the internal gas cooler 202 in the storage room (on the side of the evaporator 209) is a movable deflector 205 which can be turned in both directions about a shaft 214 provided substantially at a middle in a vertical direction in the storage room 200.

As shown in FIG. 12, moreover, when the deflector 205 is positioned on the back surface of the internal gas cooler 202, the gas fed to the internal gas cooler 202 by the blower 210 is shut off by the deflector 205 so that the refrigerant hardly gives off heat in the internal gas cooler 202. As shown in broken lines in FIG. 12, moreover, when the deflector 205 is positioned above the internal gas cooler 202, the deflector 205 does not shut off the gas flow to the internal gas cooler 202 so that the refrigerant and the air fed from the blower 210 are heat exchanged with each other in the internal gas cooler 202. Therefore, the air heated by the heat given off from the refrigerant is fed through the blow-off openings 200A into the interior of the car.

The operation of the car air-conditioner of the prior art shown in FIGS. 11 and 12 will be presently explained. First, a heating mode for heating the interior of the car will be explained. In this case, the deflector 205 is positioned above the internal gas cooler 202 as shown in broken lines in FIG. 11, and the flow regulating valve 211 is throttled so as to effect decompression in the flow regulating valve 211. Further, the flow regulating valve 212 is completely closed, while the flow regulating valve 213 is fully opened so that the flowing of the refrigerant into the evaporator 209 is impeded.

First, the air compressed in the compressor flows into the internal gas cooler 202 to be heat exchanged with the ambient air and to give off heat. At this time, the air heated by being heat exchanged with the refrigerant in the internal gas cooler 202 is fed by the blower 210 through the blow-off openings 200A into the interior of the car, thereby heating the interior of the car.

On the one hand, the refrigerant which has given off heat in the internal gas cooler 202 is decompressed in the flow regulating valve 211 and thereafter flows into a heat source side heat exchanger 203 where the refrigerant absorbs heat and is evaporated. Thereafter, the refrigerant flows through the flow regulating valve 213 and is sucked into the compressor 204 and subsequently such a cycle is repeated.

A cooling mode for cooling the interior of the car will then be explained. In this case, the deflector 205 is positioned on the back surface of the internal gas cooler 202 as shown in FIG. 12. Moreover, the flow regulating valve 211 is fully opened, and the flow regulating valve 212 is throttled to permit the refrigerant to be decompressed, while the flow regulating valve 213 is completely closed. Then, the refrigerant compressed in the compressor 204 flows into the internal gas cooler 202. In this case, because of the impediment to the gas flow from the blower 210 by the deflector 205 positioned on the back surface of the internal gas cooler 202 in the cooling mode, the refrigerant hardly gives off heat in the internal gas cooler 202 and flows into the heat source side heat exchanger 203.

The refrigerant flown into the heat source side heat exchanger 203 is heat exchanged with the ambient air so as to give off heat and thereafter the refrigerant is decompressed in the flow regulating valve 212 and absorbs heat to be evaporated in the evaporator 209. At this time, the air cooled by heat exchanging with the refrigerant is forced by the blower 210 through the blow-off openings 200A into the interior of the car, thereby cooling the interior of the car. On the other hand, the refrigerant which has absorbed the heat and evaporated in the evaporator 209 is sucked into the compressor, and subsequently such a cycle is repeated.

An operating mode for eliminating mist on glasses occurring in winter or the like will then be explained, that is, a dehumidifying heating mode for dehumidifying the interior of a car, while heating the interior. In this case, the deflector 205 is positioned above the internal gas cooler 202. Moreover, the flow regulating valves 211 and 212 are throttled to permit the refrigerant passing through these valves to be decompressed, while the flow regulating valve 213 is completely closed.

The refrigerant compressed in the compressor 204 gives off heat in the internal gas cooler 202 and is decompressed in the flow regulating valve 211, and the refrigerant absorbs heat in the heat source side heat exchanger 203. The refrigerant discharged from the heat source side heat exchanger 203 is further decompressed in the flow regulating valve 212 and thereafter flows into the evaporator 209 so as to absorb heat and to be evaporated. At this time, the air circulating in the interior of the car with the aid of the blower 210 is cooled during the stage of passing through the evaporator 209, whereby moisture is removed from the air and hence the air is dehumidified. The dehumidified air is fed by the blower 210 into the internal gas cooler 202 where the air is heat exchanged with the refrigerant so as to be heated, and thereafter the heated air is fed through the blow-off openings 200A into the interior of the car. In this way, the evaporator 209 and the internal gas cooler 202 are arranged in the storage room provided to be capable of heat exchanging with the interior of the car. In this case, the evaporator 209 is arranged on the side of the blower 210, while the internal gas cooler 202 is arranged on the side of the blow-off openings 200A to be closer thereto than the evaporator 209 so that the air in the interior of the car is cooled in the evaporator 209 and moisture is condensed and removed from the air and, thereafter, the air is heated in the internal gas cooler 202. In this manner, the dehumidifying heating mode is carried out by heating the air, while dehumidifying the air (refer to, for example, official gazette of Japanese Patent Application Laid-Open No. 19,443/2002).

Meanwhile, in the event that the movable deflector 205 is provided in the storage room 200, and the heating, cooling and dehumidifying heating for the interior of a car are carried out by controlling the deflector 205, a space in the storage room is required for accommodating the deflector 205 and means for moving it so that the capacity of the utilizing side heat exchanger 201 must be correspondingly smaller because the space is limited for installation as is the case with a car air-conditioner. Therefore, this system of the prior art suffers a disadvantage from lowered the cycle efficiency.

In the refrigerant circuit of the prior art described above, moreover, as the refrigerant which has absorbed heat in the heat source side heat exchanger 203 flows into the evaporator 209 in the dehumidifying heating mode, it is difficult to accurately adjust the evaporating amount of the refrigerant in the evaporator 209. In other words, if the evaporating amount of the refrigerant in the evaporator 209 is little, the dehumidifying effect in the evaporator 209 would become insufficient so that there is a risk of driving being disturbed because the mist on glasses cannot be rapidly removed. On the one hand, when the evaporating amount of the refrigerant in the evaporator 209 increases, although the dehumidifying effect can be sufficiently obtained, a problem would occur such that the interior of the car cannot be effectively heated due to increased air amount to be heat exchanged with the refrigerant in the evaporator 209.

In recent years, moreover, in order to reply to the global environmental problems, it has been attempted to use $CO_2$ (carbon dioxide) as a natural refrigerant without using conventional Freon gas and to operate the system so as to enable the pressure of the refrigerant on high pressure side to be supercritical pressure. In the case that the carbon dioxide is used and its high pressure side is at the supercritical pressure, the heating performance for the interior is affected by the temperature at the outlet of the internal gas cooler. When the temperature in a room is lower in heating, also the temperature at the outlet of the internal gas cooler becomes lower so that improved heating performance can be expected. In cooling, however, the gas cooler as the heat source side heat exchanger must be heat exchanged with the outdoor air at high temperatures so that the temperature at the outlet could not be lowered, which would make it difficult to exhibit sufficient cooling performance.

In order to solve the above problem, it has been attempted to provide an internal heat exchanger in a refrigerant circuit for heat exchanging the refrigerant on high pressure side which has given off heat but is prior to being decompressed and the refrigerant on the low pressure side which has absorbed heat but is prior to being sucked into the compressor. Using such an internal heat exchanger, in the cooling mode it becomes possible to cause the refrigerant to give off much more heat by heat exchanging the refrigerant which has given off heat in the internal gas cooler with the refrigerant on the low pressure side so that the temperature of the gas cooler as the heat side heat exchanger can be lowered, thereby enabling a desired cooling performance.

In the internal heat exchanger of the prior art, however, as the refrigerants in both the heating and cooling modes pass through the same flow passages, if the heat exchanged amount of the refrigerant in the internal heat exchanger is set to an optimum value for the cooling mode, the temperature of the refrigerant on the low pressure side in the heating mode would become a higher temperature by the heat exchange in the internal heat exchanger, thereby resulting in a problem of extraordinary rise of delivery temperature of the refrigerant compressed in the compressor. As a result, various problems occur in a manner that the oil in the compressor would be degraded and the compressor and other peripheral devices are adversely affected. Moreover, materials for appliances arranged in the refrigerant circuit on the high pressure side must be selected to tolerate such high temperatures so that the material choice would become difficult.

It is an object of the invention to provide a refrigerant cycle unit which solves the technical problems with the prior art and which can ensure a sufficient capacity of a utilizing side heat exchanger and is capable of smoothly dehumidifying and heating a space to be air-conditioned.

It is another object of the invention to provide a refrigerant cycle unit capable of optimizing heat exchanged amount of an internal heat exchanger in heating and cooling modes.

SUMMARY OF THE INVENTION

The refrigerant cycle unit according to the first invention comprises a first utilizing side heat exchanger and a second utilizing side heat exchanger arranged to be capable of heat exchanging with a space to be air-conditioned, a heat source side heat exchanger arranged outside the space to be air-conditioned, and a compressor for compressing and delivering a refrigerant, and is capable of performing a heating mode in which the refrigerant delivered from the compressor is caused to flow into the first utilizing side heat exchanger so as to give off heat, and after the refrigerant which has given off the heat in the first utilizing side heat exchanger has been decompressed, the refrigerant is caused to flow into the heat source side heat exchanger so as to absorb heat and to be returned to the compressor; a cooling mode in which the refrigerant delivered from the compressor is caused to flow into the heat source side heat exchanger so as to give off heat, and after the refrigerant which has given off the heat in the heat source side heat exchanger has been decompressed, the refrigerant is caused to flow into the second utilizing side heat exchanger so as to absorb heat and to be returned to the compressor; and a dehumidifying heating mode in which the refrigerant delivered from the compressor is caused to flow into the first utilizing side heat exchanger so as to give off heat and the refrigerant which has given off the heat in the first utilizing side heat exchanger is branched, and after one branched refrigerant has been decompressed, the one branched refrigerant is caused to flow into the second utilizing side heat exchanger so as to absorb heat, while after the other branched refrigerant has been decompressed, the other branched refrigerant is caused to flow into the heat source side heat exchanger so as to absorb heat, and after the one and the other branched refrigerants have discharged from the second utilizing side heat exchanger and the heat source side heat exchanger, respectively, these refrigerants are united together and returned to the compressor.

According to the refrigerant cycle unit of the invention, in the heating mode the heat deprived from the exterior in the heat source side heat exchanger is transferred to the first utilizing side heat exchanger, thereby enabling an air-conditioned space to heat, while in the cooling mode the heat absorbed from the air-conditioned space in the second utilizing heat exchanger is transferred to the heat source side heat exchanger so as to emit the heat to the exterior, thereby enabling the air-conditioned space to cool.

In this way, as it becomes possible that the refrigerant can be circulated without flowing it in the second utilizing side heat exchanger in the heating mode and without flowing the refrigerant in the first utilizing side heat exchanger in the cooling mode, the heating and cooling of the space to be air-conditioned can be effected without dividing off the air-conditioned space and the first and second utilizing side heat exchangers arranged to be capable of heat exchanging with the space to be air-conditioned by means of the movable defector, thereby resulting in correspondingly enlarged capacities of the first and second utilizing side heat exchangers.

Moreover, in the dehumidifying heating mode, the refrigerant which has given off the heat in the first utilizing side heat exchanger is branched into two flows, one of which is decompressed and caused to flow into the second utilizing side heat exchanger so as to absorb heat, and the other of which is decompressed and caused to flow into the heat source side heat exchanger so as to absorb heat. It becomes possible, therefore, that the heat to be transferred to the first utilizing side heat exchanger is deprived from the exterior in the heat source side heat exchanger, while the moisture in the air in the space to be air-conditioned is removed in the second utilizing side heat exchanger by lowering the temperature to below the dew point.

In this manner, it becomes possible that in the dehumidifying heating mode, the space to be air-conditioned is heated by means of the first utilizing side heat exchanger, while the same space is dehumidified by means of the second utilizing side heat exchanger.

Particularly, by applying the refrigerant cycle unit according to the invention to a car air-conditioner for air-conditioning the interior of a car, a remarkable effect can be accomplished in eliminating mist on windows of a car in winter.

The refrigerant cycle unit according to the second invention further comprises means for maintaining evaporating temperature of the refrigerant in the second utilizing side heat exchanger at a predetermined value or higher in the dehumidifying heating mode.

In the refrigerant cycle unit according to this invention, as the evaporating temperature of the refrigerant in the second utilizing side heat exchanger is maintained above a predetermined value in the dehumidifying heating mode of the above invention, freezing up of the second utilizing side heat exchanger can be prevented and it is possible to prevent any adverse influence on the heating with the first utilizing side heat exchanger, thereby realizing smooth dehumidifying heating.

The refrigerant cycle unit according to the third invention uses carbon dioxide as the refrigerant to be compressed in the compressor so that pressure on high pressure side can be supercritical pressure, and is provided with an internal heat exchanger for heat exchanging the refrigerant which has given off heat and is prior to being decompressed and the refrigerant which has absorbed heat.

In the refrigerant cycle unit of this invention, carbon dioxide is used as a refrigerant to be compressed in the compressor in each of the inventions so as to permit the pressure of the refrigerant on the high pressure side to be supercritical pressure, so that the internal gas cooler has a temperature gradient and hence there is need to have a heat exchanger in a countercurrent relationship with the air for improving the efficiency. By providing such a heat exchanger, heating performance for the space to be air-conditioned can be improved.

Moreover, by providing the internal heat exchanger for heat exchanging the refrigerant which has given off heat but is prior to being decompressed with the refrigerant which has absorbed heat, the temperature of the refrigerant prior to being decompressed can be lowered in the cooling mode so that the cooling performance for the space to be cooled is improved.

Moreover, by heat exchanging the refrigerant which has absorbed heat with the refrigerant prior to being decompressed, overheating of the refrigerant to be returned to the compressor can be eliminated so that unfavorable liquid back, that is, returning of liquid refrigerant to the compressor can be previously prevented.

The refrigerant cycle unit according to the fourth invention comprises a utilizing side heat exchanger arranged to be capable of heat exchanging with a space to be air-conditioned, a heat source side heat exchanger arranged outside the space to be air-conditioned, and a compressor for compressing and delivering a refrigerant, and uses carbon dioxide as the refrigerant and pressure on high pressure side becoming possibly supercritical pressure, wherein an internal heat exchanger is provided for heat exchanging the refrigerant discharged from the utilizing side heat exchanger and the refrigerant discharged from the heat source side heat exchanger, a heating mode can be performed in which the refrigerant delivered from the compressor is caused to flow into the utilizing side heat exchanger so as to give off heat, and after the refrigerant which has given off the heat in the utilizing side heat exchanger has been decompressed, the refrigerant is caused to flow into the heat source side heat exchanger so as to absorb heat and to be returned to the compressor, and a cooling mode can be performed in which the refrigerant delivered from the compressor is caused to flow into the heat source side heat exchanger so as to give off heat, and after the refrigerant which has given off the heat in the heat source side heat exchanger has been decompressed, the refrigerant is caused to flow into the utilizing side heat exchanger so as to absorb heat and to be returned to the compressor, and wherein the heat exchanged amount of the refrigerant in the internal heat exchanger in the cooling mode is greater than the heat exchanged amount in the heating mode.

According to the refrigerant cycle unit according to this invention, by using carbon dioxide as a refrigerant, the pressure of the refrigerant on the high pressure side becomes supercritical pressure so that the carbon dioxide refrigerant gives off heat, while maintaining the supercritical condition without condensation of the carbon dioxide in the utilizing side heat exchanger in the heating mode, thereby enabling the temperature of the ambient air to be heated more quickly.

Furthermore, by providing the internal heat exchanger for heat exchanging the refrigerant discharged from the utilizing side heat exchanger with the refrigerant discharged from the heat source side heat exchanger, the temperature at the outlet of the heat source side heat exchanger in the cooling mode can be lowered.

Particularly, by making the heat exchanged amount of the refrigerant in the internal heat exchanger in the cooling mode larger than that in the heating mode, it becomes possible that the refrigerant in the cooling mode is more effectively super-cooled to improve the cooling performance in the utilizing side heat exchanger, while temperature rise of the refrigerant delivering from the compressor in the heating mode can be suppressed.

The refrigerant cycle unit according to the fifth invention includes the internal heat exchanger integrally comprising at least three refrigerant flow passages capable of heat exchanging with one another and having heat exchanging capabilities therebetween different from one another, and at least one refrigerant of the refrigerants discharged from the utilizing side heat exchanger and the heat source side heat exchanger, respectively, is caused to flow in the different refrigerant flow passage depending upon the heating and cooling modes to vary heat exchanged amounts of the heating and cooling modes.

As in this invention the internal heat exchanger integrally comprises at least three refrigerant flow passages which are capable of heat exchanging with one another and have heat exchanging capabilities different from one another. At least one of refrigerants discharged from the utilizing side heat exchanger and the heat source side heat exchanger is caused to flow in the different refrigerant flow passage depending on the heating mode and the cooling mode so that the heat exchanged amounts are caused to be different from each other, thereby enabling the space for installing the internal heat exchanger to be restrained to the minimum. In this way, the compact refrigerant cycle unit in construction can be achieved.

DETAILED DESCRIPTION OF THE PREFERRED EMBODIMENT

Figure 1:
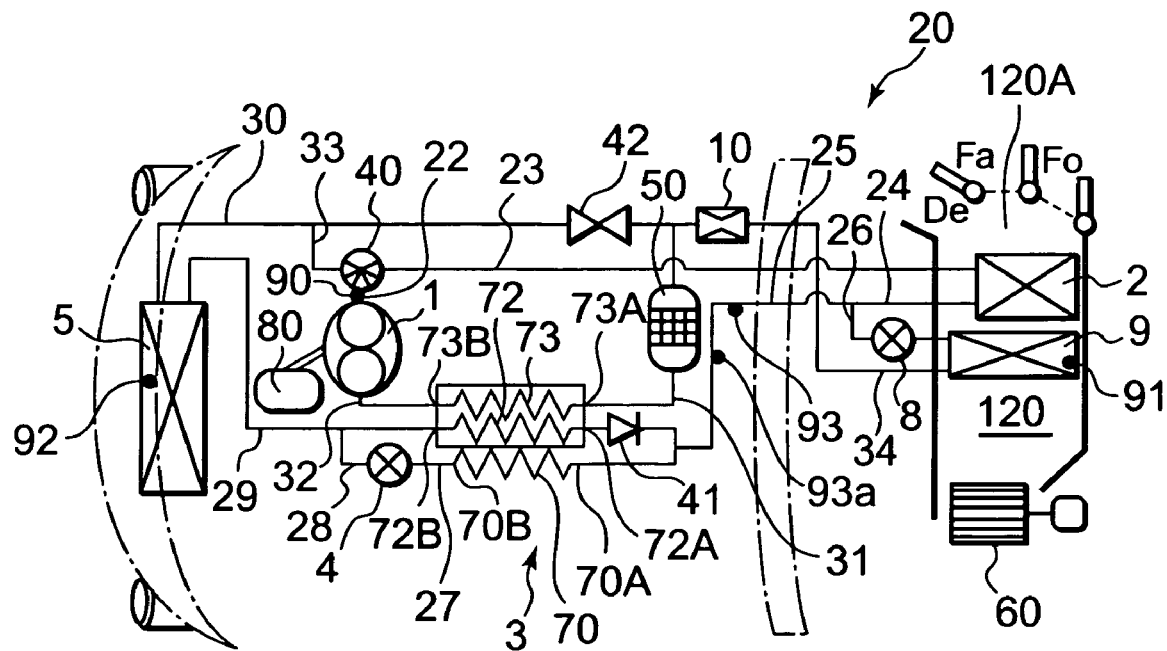
FIG. 1 is a refrigerant circuit diagram of a car air-conditioner as one embodiment of the refrigerant cycle unit according to the invention.

Configuration for carrying out the present invention will be explained in detail with reference to the drawings hereinafter. FIG. 1 is a refrigerant circuit diagram in the case that the refrigerant cycle unit is applied to a car air-conditioner for air-conditioning the interior of a vehicle as one embodiment of the refrigerant cycle unit according to the invention. The car air-conditioner of the embodiment is applicable at least to an automobile driven by an engine, hybrid car, fuel cell car and the like.

In FIG. 1, reference numeral 20 denotes the refrigerant cycle unit for the automobile of the present embodiment, which comprises an internal gas cooler 2 as a first utilizing side heat exchanger, an evaporator 9 as a second utilizing side heat exchanger, an external heat exchanger 5 as a heat source side heat exchanger, a compressor 1 for compressing a refrigerant and delivering the compressed refrigerant, and the like. In other words, in the refrigerant cycle unit 20, the refrigerant circuit is configured by connecting by means of pipelines the compressor 1, the internal gas cooler 2, a first expansion valve 4 and a second expansion valve 8 as decompression means, the evaporator 9, the external heat exchanger 5 and the like. The internal gas cooler 2 and the evaporator 9 are arranged to be capable of heat exchanging with the interior of the car as a space to be air-conditioned, while the external heat exchanger 5 is arranged outwardly of the car (or in the space not air-conditioned where there is no person).

The compressor 1 in the present embodiment is a multi-stage compression rotary compressor having first and second rotary compressing elements in a hermetic vessel and uses carbon dioxide ($CO_2$) as a refrigerant. Consequently, the refrigerant circuit on the high pressure side of the refrigerant cycle unit 20 could be at a supercritical pressure.

The pipe 22 of the compressor 1 on the delivery side is connected to a three way valve 40. One pipe 23 extending from the three way valve 40 is connected to the internal gas cooler 2. The gas cooler 2 serves to heat the interior of the car by heat exchanging between the refrigerant gas at high temperatures and pressures delivered from the compressor 1 and the air in the interior of the car. Connected to the outlet of the internal gas cooler 2 is one end of a pipe 24 which is branched on its way, one branched pipe 26 leading to the second expansion valve 8.

On the one hand, the other pipe 25 branched from the pipe 24 is connected to one end 70A of a refrigerant pipe 70 of the internal heat exchanger 3 later described. Connected to the other end 70B of the refrigerant pipe 70 is a pipe 27 which is connected to the first expansion valve 4, and a pipe 28 extending from the first expansion valve 4 is connected to the mid portion of a pipe 29.

One end of the pipe 29 is connected to one end of the external heat exchanger 5, while the other end is connected to other end 72B of a refrigerant flow passage 72 formed inside a refrigerant pipe 71 of the internal heat exchanger 3. Connected to the other end of the external heat exchanger 5 is one end of a pipe 30 which extends through a magnetic valve 42 and is connected at the other end to a receiver tank 50. A pipe 31 extending from the receiver tank 50 is connected to one end 73A of a refrigerant flow passage 73 formed on the outer circumference of the refrigerant flow passage 72 of the refrigerant pipe 71 of the internal heat exchanger 3. A pipe 32 extending from the other end 73B of the refrigerant flow passage 73 is connected to the inlet of the compressor 1.

On the one hand, another pipe 33 extending from the three way valve 40 is connected to the pipe 30 at its halfway portion. Moreover, a pipe extending from one end 72A of the refrigerant flow passage 72 of the internal heat exchanger 3 passes through a check valve 41 and is then connected to the pipe 25 at its halfway portion. The check valve 41 causes the refrigerant to flow from the internal heat exchanger 3 to the pipe 25, but prevents the refrigerant from flowing from the pipe 25 to the internal heat exchanger 3.

On the other hand, the one pipe 26 branched from the pipe 24 extends through the second expansion valve 8 and is connected to the evaporator 9. A pipe 34 extending from the evaporator 9 passes through a constant pressure valve 10 later described and is connected to the pipe 30 at its halfway portion.

Figure 2:
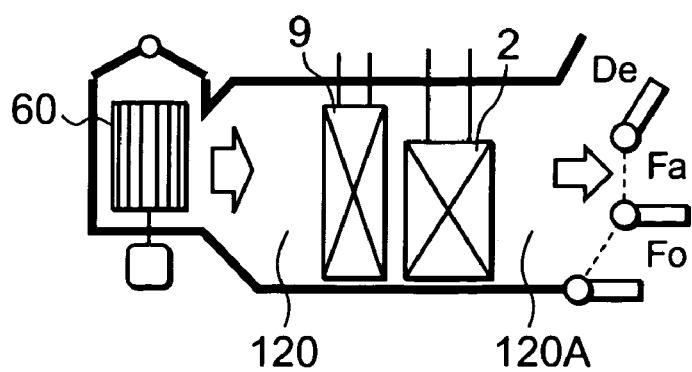
FIG. 2 is a perspective view of an internal heat exchanger of the car air-conditioner of FIG. 1.

As shown in FIG. 2, the internal gas cooler 2 and the evaporator 9 are juxtaposed in a storage room 120 which is able to heat exchange with the interior of the car and is formed at its one end with blow-off openings directing three directions toward the lower foot Fo, front face Fa and glass surfaces De such as a windshield in the car. In this case, the inner gas cooler 2 is arranged on the side of the blow-off openings 120A in the storage room 120, while the evaporator 9 on the opposite side from the blow-off openings 120A. Moreover, located on the opposite side of the blow-off openings 120A with respect to the internal gas cooler 2 and the evaporator 9 in the storage room 120 is a blower 60 which sucks the air in the interior or the out side of the car to feed it into the internal gas cooler 2 and the evaporator 9 so that the air which has been heat exchanged with the internal gas cooler 2 and the evaporator 9 is caused to be circulated in the interior of the car, thereby air-conditioning the interior of the car.

Moreover, an external blower (not shown) is provided in the proximity of the external heat exchanger 5. In heating mode and dehumidifying heating mode later described, the external heat exchanger 5 causes the refrigerant to absorb the heat in the external heat exchanger 5 to collect the heat from the exterior, while in cooling mode, the heat in the interior of the car absorbed in the evaporator 9 is transferred to the external heat exchanger 5 so as to be discharged to the exterior.

The constant pressure valve 10 described above serves to maintain the evaporating temperature of the refrigerant in the evaporator 9 at a predetermined value or higher, for example, 0° C. or higher. In the present embodiment, the refrigerant is caused to pass through the constant pressure valve 10 so that the pressure of the refrigerant becomes 3.5 MPa. As a result, the car air-conditioner according to the present embodiment can maintain the evaporating temperature of the refrigerant in the evaporator 9 at 0° C. or higher temperature, thereby preventing the evaporator 9 from being frozen. In the dehumidifying heating mode, moreover, by maintaining the evaporating temperature of the refrigerant in the evaporator 9 at 0° C. or higher in the dehumidifying heating mode, the dehumidifying heating can be smoothly realized without adversely affecting the heating by the internal gas cooler 2 more than necessity minimum.

Furthermore, the first and second expansion valves 4 and 8 are magnetic valves which can be adjustably throttled and completely closed, whose throttled degree is controlled by a controller 80 later described. In the drawing, the circuit includes a temperature sensor 90 for detecting the temperature of the refrigerant at the outlet of the compressor, a temperature sensor 91 for detecting the evaporating temperature of the refrigerant in the evaporator 9, a temperature sensor 92 for detecting the temperature of refrigerant in the external heat exchanger 5, and a temperature sensor 93 for detecting the temperature of the refrigerant passing through the pipe 25. These temperature sensors are connected to the controller 80.

The controller 80 described above is a control device for controlling the car air-conditioner and is adapted to control respective operations of the constant pressure valve 10, the three way valve 40, the magnetic valve 42, the first and second expansion valves 4 and 8, the blower 60, the external blower (not shown) provided in the proximity of the external heat exchanger 5 and the compressor 1. Connected to the input of the controller 80 are the temperature sensors 90, 91, 92 and 93 described above, an internal temperature sensor (not shown) for detecting the temperature in the interior of the car, and an internal humidity sensor for detecting the humidity in the interior of the car, and the like. Connected to the output of the controller 80 are the constant pressure valve 10, the three way valve 40, the magnetic valve 42, the first and second expansion valves 4 and 8, the blower 60, the external blower, and the compressor 1.

Moreover, the controller 80 controls the frequency of the compressor 1 on the basis of set temperatures and the temperatures in the interior of the car detected by the temperature sensors 90, 91, 92 and 93 and the internal temperature sensor to control the temperature in the interior of the car, and further controls the degree of opening of the second expansion valve 8 on the basis of the high pressure detected by a pressure sensor 93a and the temperature detected by the temperature sensor 93.

In the heating mode, namely, the controller 80 controls the first expansion valve 4 to realize a predetermined pressure in order to operate the air-conditioner under an operating pressure set by the temperature sensor 93. Under this condition, if the temperature in the interior of the car detected by the internal temperature sensor lowers below the set temperature, the frequency of the compressor 1 is increased. If the temperature in the interior of the car rises above the set temperature, the controller 80 lowers the frequency of the compressor 1.

On the one hand, in the cooling mode, the frequency of the compressor 1 is controlled so as to bring the evaporating temperature of the refrigerant in the evaporator 9 to a predetermined temperature, while if the temperature in the interior of the car detected by the internal temperature sensor rises above the predetermined temperature, the controller 80 increases the frequency of the compressor 1, and if the temperature in the interior of the car lowers below the set temperature, the controller 80 lowers the frequency of the compressor 1.

In the dehumidifying heating mode, further, in addition to the control of the frequency of the compressor 1 based on the temperatures of the refrigerant detected by the respective temperature sensors 90, 91, 92 and 93, the controller 80 increases the degree of opening of the second expansion valve 8 if the humidity in the interior of the car detected by the internal humidity sensor rises above the set humidity. By such a controlling, an increased amount of the refrigerant flows in the evaporator 9, so that an increased amount of moisture in the air in the interior of the car can be condensed and removed. Moreover, if the humidity in the interior of the car lowers below the set humidity, the controller 80 causes the degree of opening of the second expansion valve 8 to be reduced to decrease the amount of the refrigerant flowing into the evaporator 9.

At this point, the internal heat exchanger 3 described above serves to cause the two refrigerants to be heat exchanged, that is, the refrigerant exhausted from the internal gas cooler 2 or the evaporator 9 as utilizing side heat exchangers arranged to be capable of heat exchanging with the interior of the car, and the refrigerant exhausted from the external heat exchanger 5 as a heat source side heat exchanger arranged outwardly of the car. The heat exchanged amount of the refrigerant in the internal heat exchanger 3 in the cooling mode later described is greater than the heat exchanged amount of the refrigerant in the internal heat exchanger 3 in the heating mode. In more detail, the internal heat exchanger 3 is integrally provided with at least three refrigerant flow passages which are capable of heat exchanging with one another and are different in heat exchanging capability from one another so that at least one of the refrigerant exhausted from the utilizing side heat exchanger (the internal gas cooler 2 or evaporator 9) and the refrigerant exhausted from the heat source side heat exchanger (external heat exchanger 5) is caused to flow in different refrigerant flow passage depending upon the heating mode and cooling mode, thereby making different the heat exchanged amounts in the two modes.

Figure 3:
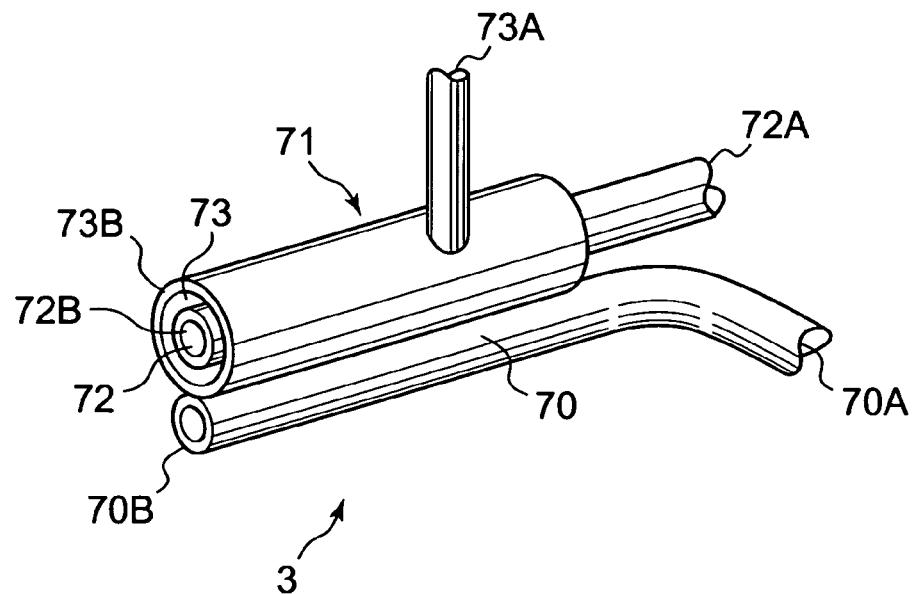
FIG. 3 is a layout view of a utilizing side heat exchanger of the car air-conditioner of FIG. 1.

As shown in FIG. 3, the internal heat exchanger 3 in the present embodiment comprises the refrigerant pipe 71 of a double tube structure consisting of the refrigerant flow passage 72 and the refrigerant flow passage 73 formed around its outer circumference, and the refrigerant pipe 70 abutting (in line contact) against the refrigerant pipe 71 and formed inwardly with a refrigerant flow passage.

The pipe 25 is connected to the one end 70A of the refrigerant pipe 70, while the pipe 27 is connected to the other end 70B of the refrigerant pipe 70. The one end 72A of the refrigerant flow passage 72 inside the refrigerant pipe 71 is connected to a pipe leading to the check valve 41, and the other end 72B is connected to the other end of the pipe 29. Moreover, the pipe 30 is connected to the one end 73A of the refrigerant flow passage 73 formed around the outer circumference of the refrigerant flow passage 72 of the refrigerant pipe 71, while the other end 73B is connected to the pipe 32 leading to the compressor 1.

Figure 4:
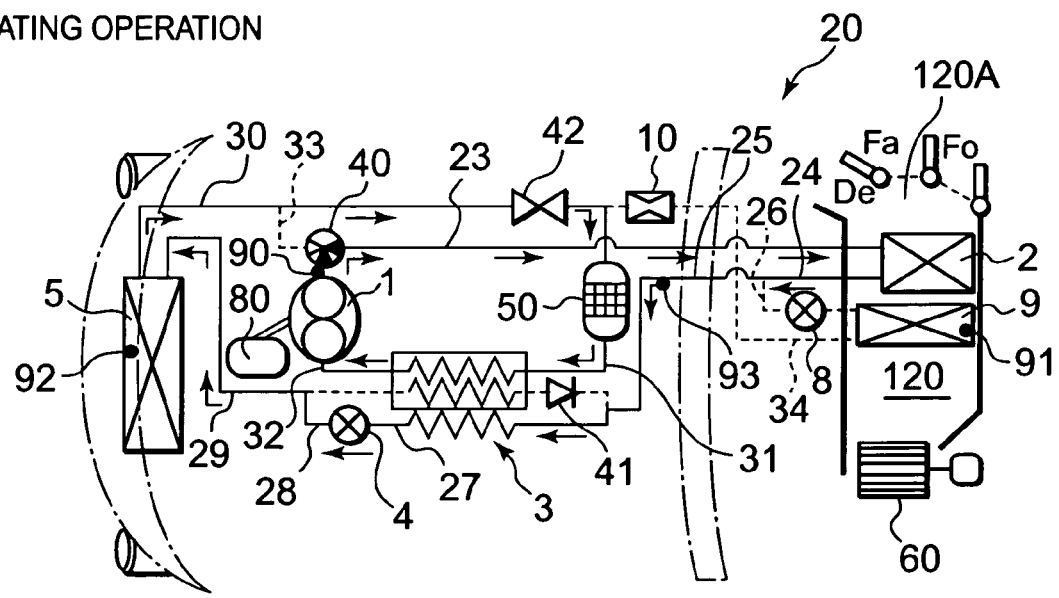
FIG. 4 is a view illustrating flows of the refrigerant in the heating mode of the car air-conditioner of FIG. 1.
Figure 7:
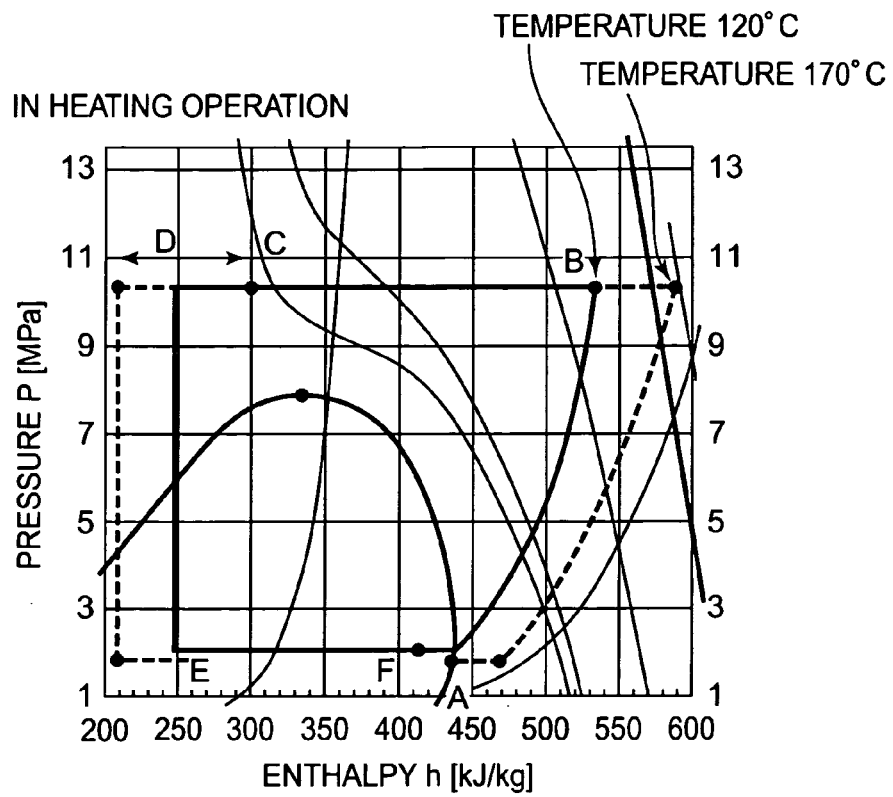
FIG. 7 is a Mollier chart in the heating mode of the car air-conditioner of FIG. 1.

The operation of the car air-conditioner configured as just described will be explained. First, an example of heating mode for heating the interior of the car will be explained with reference to FIGS. 4 and 7. FIG. 4 illustrates flows of the refrigerant in the heating mode. FIG. 7 shows a Mollier chart in this case. In FIG. 4, solid lines illustrate piping in which the refrigerant flows, while broken lines show piping in which no refrigerant flows. Arrows illustrate the flows of the refrigerant. In the heating mode, the controller 80 controls the respective components provided in the refrigerant circuit such that the magnetic valve 42 is opened, the second expansion valve 8 is completely closed, and first expansion valve 4 is throttled, thereby reducing the pressure of the refrigerant passing through the expansion valve 4 to a predetermined pressure. Further, the controller 80 controls the three way valve 40 to be switched over to cause the refrigerant to flow from the pipe 22 to the pipe 23.

When the compressor 1 is driven, the refrigerant compressed therein is delivered into the pipe 22. At this time, the refrigerant has been compressed to a suitable supercritical pressure (state of a solid line B in FIG. 7). The refrigerant delivered into the pipe 22 flows through the three way valve 40 and through the pipe 23 into the internal gas cooler 2, where the refrigerant is heat exchanged with the ambient air to give off the heat (state of a solid line C in FIG. 7). Then, the air heated by receiving the heat from the refrigerant is feed to the blow-off openings 120A by means of the blower 60 to be delivered into the interior of the car, thereby heating the interior of the car. The carbon dioxide refrigerant is not condensed in the internal gas cooler 2 so that the refrigerant gives off heat while maintaining its supercritical condition. Accordingly, the heat exchanging capability becomes very high so that the ambient air can be heated to a higher temperature.

On the one hand, the refrigerant which has given off the heat at the internal gas cooler 2 leaves the gas cooler 2 and enters the pipe 24. At this time, as the second expansion valve 8 is completely closed as described above, the refrigerant flowing through the pipe 24 entirely flows into the pipe 25 without flowing through the pipe 26 into the evaporator 9, and enters the refrigerant pipe 70 through the one end 70A and further passes through the internal heat exchanger 3. In the internal heat exchanger 3, the refrigerant on the high pressure side which has given off the heat at the internal gas cooler 2 but is prior to being decompressed, performs the heat exchange with the refrigerant on the low pressure side discharged from the external heat exchanger 5 and flowing through the refrigerant flow passage 73 of the refrigerant pipe 72 provided in a heat exchanging relationship with the refrigerant pipe 70, thereby further giving off heat (state of a solid line D in FIG. 7).

The refrigerant which has given off the heat in the internal heat exchanger 3 and discharged from the other end 70B of the refrigerant pipe 70 arrives at the first expansion valve 4. The refrigerant reduces its pressure in the first expansion valve 4 so that it becomes a mixture of two phases, gas and liquid (state of a solid line E in FIG. 7), and the refrigerant under this condition flows into the external heat exchanger 5, whereupon the refrigerant absorbs the heat from the ambient air and evaporates (state of a solid line F in FIG. 7). Thereafter, the refrigerant enters the pipe 30 and flows through the magnetic valve 42 into the receiver tank 50, whereupon the gas and the liquid phases of the refrigerant are separated from each other, and only the gas refrigerant flows through the pipe 31 into the refrigerant flow passage 73 of the refrigerant pipe 72 at the one end 73A so that the gas refrigerant passes through the internal heat exchanger 3. In the internal heat exchanger 3, the refrigerant gas is heat exchanged with the refrigerant which has given off the heat in the internal gas cooler 2 but is prior to being decompressed so that the refrigerant gas is heated (state of a solid line A in FIG. 7). In this way, the overheat of the refrigerant before being sucked into the compressor 1 can be eliminated in the internal heat exchanger 3, with the result that it is possible to preclude an occurrence of liquid back, that is, suction of the liquid refrigerant into the compressor 1. And the refrigerant mist forms a part of the refrigerant came out of the receiver tank 50 is heated to be gas. So it can be prevented that the compression efficiency of the compressor 1 falls. Consequently, the refrigerant discharged from the internal heat exchanger 3 is sucked through the pipe 32 into the compressor 1 and subsequently such a cycle is repeated.

Figure 5:
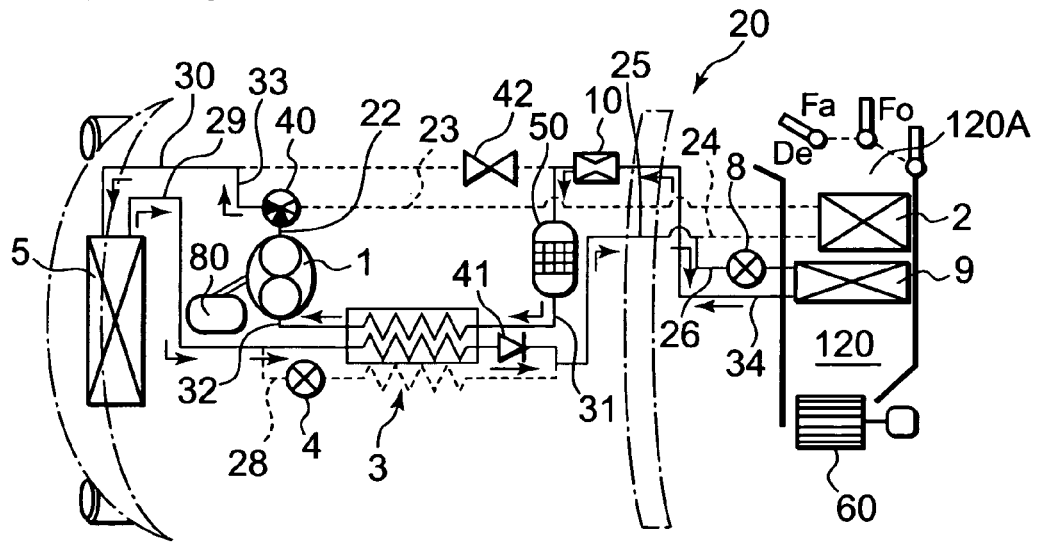
FIG. 5 is a view illustrating flows of the refrigerant in the cooling mode of the car air-conditioner of FIG. 1.
Figure 8:
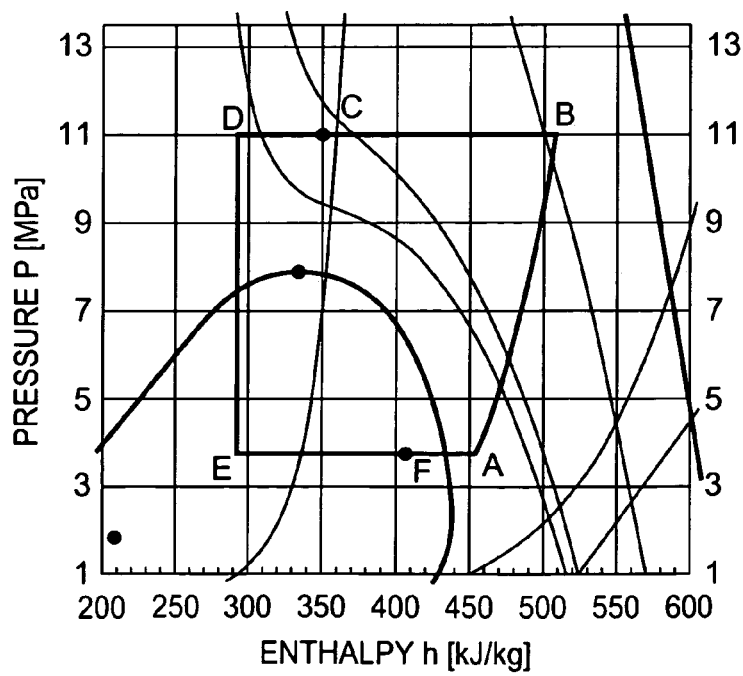
FIG. 8 is a Mollier chart in the cooling mode of the car air-conditioner of FIG. 1.

Example of the cooling mode for cooling the interior of the car will then be explained with reference to FIGS. 5 and 8. FIG. 5 illustrates flows of the refrigerant in the cooling mode, while FIG. 8 illustrates a Mollier chart in this case. In FIG. 5, solid lines illustrate piping in which the refrigerant flows, while broken lines show piping in which no refrigerant flows. Arrows illustrate the flows of the refrigerant. In the cooling mode, the controller 80 controls the respective components provided in the refrigerant circuit such that the magnetic valve 42 is closed, and the three way valve 40 is switched over to cause the refrigerant to flow from the pipe 22 to the pipe 33. Moreover, the second expansion valve 8 is throttled so as to control the high pressure to maintain a predetermined pressure, while the first expansion valve 4 is completely closed.

When the compressor 1 is driven, the refrigerant compressed in the compressor 1 is delivered into the pipe 22. At this time, the refrigerant has been compressed to a suitable supercritical pressure (state of B in FIG. 8). The refrigerant delivered into the pipe 22 flows through the three way valve 40 and through the pipe 33 into the external heat exchanger 5 where the refrigerant is heat exchanged with the ambient air to give off heat (state of C in FIG. 8). In the external heat exchanger 5, the carbon dioxide refrigerant gives off its heat without condensing, while maintaining its supercritical condition.

The refrigerant which has given off the heat in the external heat exchanger 5 leaves it and then flows through the pipe 29 into the refrigerant flow passage 72 of the refrigerant pipe 71 at the other end 72B to pass through the internal heat exchanger 3. In the internal heat exchanger 3, the refrigerant on the high pressure side which has given off the heat at the external heat exchanger 5 but is prior to being decompressed is heat exchanged with the refrigerant on the low pressure side which has absorbed the heat in the evaporator 9 and discharged from the receiver tank 50 and is flowing through the refrigerant flow passage 73 formed around the outer circumference of the refrigerant flow passage 72, whereby the refrigerant on the high pressure side further gives off heat (state of D in FIG. 8)

The refrigerant discharged from the one end 72A of the refrigerant flow passage 72 leads through the check valve 41 and pipes 25 and 26 to the second expansion valve 8. The refrigerant is caused to reduce its pressure in the expansion valve 8 so that it becomes a mixture of two phases, gas and liquid (state of E in FIG. 8), and the refrigerant under this condition further flows into the evaporator 9, where the refrigerant absorbs the heat from the ambient air to be evaporated (state of F in FIG. 8). At this time, the air from which the heat has been removed by heat absorption of the refrigerant and cooled is fed to the blow-off openings 120A by means of the blower 60 and is delivered into the interior of the car, thereby performing the cooling of the interior of the car. In this case, the refrigerant which has given off the heat in the external heat exchanger 5 is further caused to give off heat in the internal heat exchanger 3, as shown at D in FIG. 8, thereby further improving the heat exchanging capability of the refrigerant. Moreover, the refrigerant on the high pressure side which has given off the heat in the external heat exchanger 5 and the refrigerant on the low pressure side which has evaporated in the evaporator 9 and has been scheduled to be heat exchanged with the refrigerant on the high pressure side are caused to flow countercurrently in the internal heat exchanger 3, whereby the heat exchanging capability can be even more improved.

Accordingly, it becomes possible to make the improvement of the cooling performance of the evaporator 9 per a flow rate unit so that the temperature of the ambient air can be cooled to the predetermined temperature more quickly, even if the temperature of the out side air is very high, for example middle of summer.

Moreover, the refrigerants on the high pressure side in the heating and cooling modes flow in the different passages in the internal heat exchanger 3, respectively. In more detail, the refrigerants on the low pressure side in both the heating and cooling modes are caused to flow in the refrigerant flow passage 73 formed around the outer circumference of the refrigerant flow passage 72 in the refrigerant pipe 71, but the refrigerant on the high pressure side in the heating mode is caused to flow in the refrigerant pipe 70 provided in the heat exchanging relationship with the refrigerant pipe 71, while the refrigerant on the high pressure side in the cooling mode is caused to flow in the refrigerant pipe 72 formed in the inner circumference of the refrigerant flow passage 73 of the refrigerant pipe 71. In other words, the heat exchanged amount of the refrigerant flowing through the refrigerant flow passage 72 arranged in more heat exchanging relationship with the refrigerant flow passage 73 through which the refrigerant on the lower pressure side flows is greater than that of the refrigerant flowing in the refrigerant flow passage in the refrigerant pipe 70.

Accordingly, it becomes possible to cause the refrigerant on the high pressure side which has already given off its heat in the external heat exchanger 5 to give off a greater amount of heat in the internal heat exchanger 3. In the heating mode, moreover, in the internal heat exchanger 3 it is also possible to suppress the heat amount emitted from the refrigerant on the high pressure side which has already given off heat in the internal gas cooler 2.

At this moment, a case that the refrigerants at low and high pressure sides in both the heating and cooling modes are caused to flow in the same flow passages will be explained, for example, it is a case that in both the modes the refrigerants on the low pressure side are caused to flow in the refrigerant flow passage 73 of the refrigerant pipe 71, and the refrigerants on the high pressure side are caused to flow in the refrigerant flow passage 72 formed in the inner circumference of the refrigerant pipe 71. In this case, in the cooling mode, the heat exchanged amount in the internal heat exchanger 3 becomes greater as shown in FIG. 8 in the present embodiment so that the evaporating temperature of the refrigerant in the evaporator 9 described above can be lowered, thereby enabling the cooling performance to be improved. In the heating mode, however, the refrigerant on the low pressure side becomes at higher temperature by the heat exchange in the internal heat exchanger 3 as shown in broken lines in FIG. 7 so that the delivery temperature of the refrigerant compressed in the compressor 1 extraordinarily rises to reach approximately +170° C. This may cause various problems such as bad influences on peripheral equipment and degradation of oil in the compressor 1. Moreover, materials for appliances arranged on the high temperature side of the refrigerant circuit must be selected to resistant to such high temperatures to bring about obstacles to choice of materials.

On the other hand, in the case that in both the modes the refrigerants on the low pressure side are caused to flow in the refrigerant flow passage 73 of the refrigerant pipe 71, and the refrigerants on the high pressure side are caused to flow in the refrigerant pipe 70 provided in the heat exchanging relationship with the refrigerant pipe 71 and having the heat exchanging amount smaller than the refrigerant flow passage 72, the refrigerant on the high temperature side in the heating mode can be kept at a predetermined high temperature (for example, +120° C.), while avoiding the extraordinary temperature rise on the high temperature side as shown in solid lines in FIG. 7. In the cooling mode, however, the temperature before arriving at the second expansion valve 8 rises owing to the smaller heat exchanging amount in the internal heat exchanger 3 so that the enthalpy value at the inlet of the evaporator 9 cannot be lowered sufficiently, causing a problem of poor cooling performance.

In contrast with these cases, however, the refrigerants on the high pressure sides in the cooling and heating modes are caused to flow in the different refrigerant flow passages to make the heat exchanged amount in the internal heat exchanger 3 in the cooling mode greater than that in the heating mode described above according to the invention, with the result that the refrigerant discharged from the external heat exchanger 5 in the cooling mode can be effectively super-cooled, whereby the cooling performance in the evaporator 9 is improved while the temperature rise of the refrigerant delivered from the compressor 1 in the heating mode can be suppressed.

Moreover, the internal heat exchanger 3 is configured by the refrigerant pipe 71 of the double tube structure and the refrigerant pipe 70 provided in the heat exchanging relationship with the refrigerant pipe 71 so that there can be the three refrigerant flow passages integrally provided to have the different heat exchanging capabilities from one another. In this way, the performance of the refrigerant cycle unit 20 can be improved, while the space in which the internal heat exchanger 3 is placed can be restrained to the minimum.

On the one hand, the refrigerant evaporated in the evaporator 9 enters the pipe 34 and passes through the constant pressure valve 10 where the pressure of the refrigerant becomes the constant pressure of 3.5 MPa, and thereafter the refrigerant flows through the pipe 30 into the receiver tank 50. In the receiver tank 50, the refrigerant is divided into gas and liquid, and only the gas refrigerant separated from the refrigerant in the receiver tank 50 flows through the pipe 31 into the refrigerant flow passage 73 of the refrigerant pipe 71 at the one end 73A and passes through the internal heat exchanger 3. In the heat exchanger 3, the refrigerant gas is heat exchanged with the refrigerant which has given off the heat in the external heat exchanger 5 but is prior to being decompressed so that the refrigerant gas is heated (state of A in FIG. 8). In this way, the lower pressure refrigerant is prevented from being overheated. And the refrigerant discharged from the internal heat exchanger 3 is sucked through the pipe 32 into the compressor, and subsequently such a cycle is repeated.

Figure 6:
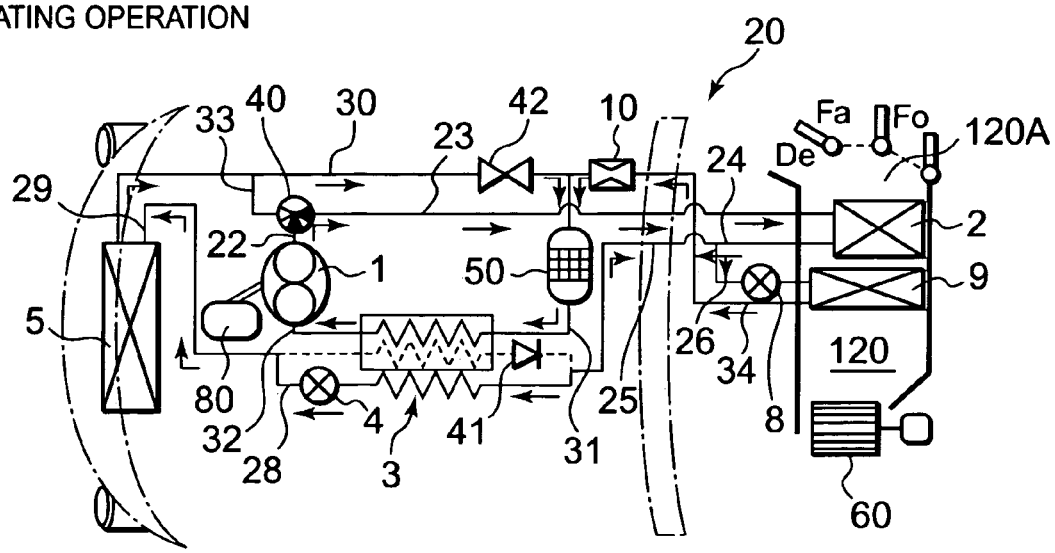
FIG. 6 is a view illustrating flows of the refrigerant in the dehumidifying heating mode of the car air-conditioner of FIG. 1.
Figure 9:
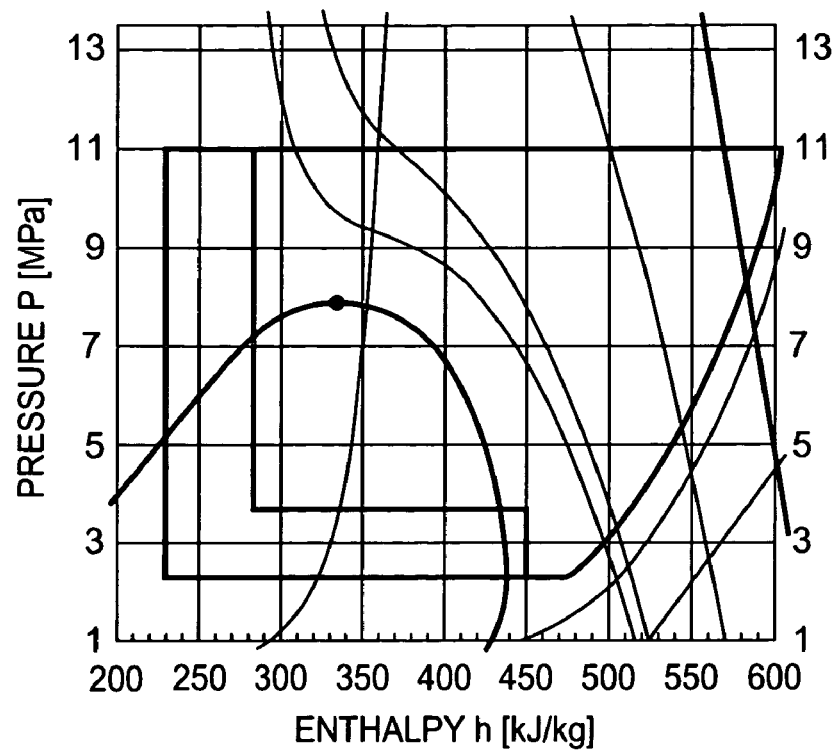
FIG. 9 is a Mollier chart in the dehumidifying heating mode of the car air-conditioner of FIG. 1.

An example of the dehumidifying heating mode for eliminating mist on glasses when heating the interior of the car in winter or the like will be explained with reference to FIGS. 6 and 9. FIG. 6 illustrates flows of the refrigerant in the dehumidifying heating mode. FIG. 9 shows a Mollier chart for this case. In FIG. 6, solid lines illustrate pipes through which the refrigerant flows, and broken lines show pipes through which no refrigerant flows. Arrows illustrate the flows of the refrigerant. In the dehumidifying heating mode, the controller 80 controls in a manner that the magnetic valve 42 is opened and the three way valve 40 is switched over to cause the refrigerant to flow from the pipe 22 to pipe 23. Moreover, the controller 80 controls the first and second expansion valves 4 and 8 to be throttled so that the pressure of the refrigerant passing through these valves 4 and 8 is reduced.

When the compressor 1 is driven, the refrigerant compressed in the compressor 1 is delivered into the pipe 22. At this time, the refrigerant is compressed to a suitable supercritical pressure (state of B in FIG. 9). The refrigerant delivered into the pipe 22 flows through the three way valve 40 and through the pipe 23 into the internal gas cooler 2 where the refrigerant is heat exchanged with the ambient air to give off heat (state of C in FIG. 9). And the air heated by receiving the heat from the refrigerant is fed by the blower 60 to the blow-off openings 120A and delivered into the interior of the car for heating the interior of the car. Moreover, the carbon dioxide refrigerant gives off the heat, while maintaining the super-critical condition in the internal gas cooler 2 without being condensed, with the result that the heat exchanging capability becomes extremely high to enable the ambient air to be heated to higher temperatures.

On the one hand, the refrigerant which has given off the heat in the internal gas cooler 2 leaves it and enters the pipe 24, where the refrigerant flowing through the pipe 24 is branched and one branched refrigerant leads through the pipe 26 to the second expansion valve 8. This refrigerant reduces its pressure in the second expansion valve 8 so as to become a mixture of two phases, gas and liquid phases (state of E in FIG. 9) and the refrigerant under this condition flows into the evaporator 9, where the refrigerant absorbs heat from the ambient air and evaporates (state of F in FIG. 9). At this time, it is possible to condense and remove the moisture in the air in the interior of the car by lowering the temperature in the evaporator 9 to below the dew point. In this way, the moisture in the air in the interior of the car is removed to achieve the dehumidification in the interior of the car. The air which has been dehumidified is fed by the blower 60 to the internal gas cooler 2, and as described above the air is heat exchanged with the refrigerant flowing through the internal gas cooler 2 to be heated and thereafter the heated air is delivered through blow-off openings 120A into the interior of the car. In this manner, the mist on the glasses can be eliminated, while the air in the interior of the car is being heated and dehumidified.

On the one hand, the refrigerant evaporated in the evaporator 9 enters the pipe 34 and passes through the constant pressure valve 10, and thereafter enters the pipe 30.

On the other hand, the other refrigerant branched in the pipe 24 flows through the pipe 25 into the refrigerant pipe 70 to pass through the internal heat exchanger 3. In the internal heat exchanger 3, the refrigerant on the high pressure side which has given off heat in the internal gas cooler 2 but is prior to being decompressed is heat exchanged with the refrigerant on the low pressure side flowing through the refrigerant flow passage 73 of the refrigerant pipe 71 provided in the heat exchanging relationship with the refrigerant pipe 70 so that the refrigerant on the high pressure side further gives off the heat (state of D in FIG. 9).

The refrigerant which has given off the heat in the internal heat exchanger 3 and discharged from the other end 70B of the refrigerant pipe 70 leads to the first expansion valve 4 where the refrigerant reduces its pressure to become a mixture of two phases, gas and liquid (state of E in FIG. 9), and the refrigerant under this condition flows into the external heat exchanger 5. In the external heat exchanger 5, the refrigerant absorbs heat from the ambient air so as to evaporate. Thereafter, the refrigerant enters the pipe 30 and flows through the magnetic valve 42 and then flows together with the refrigerant flowing from the pipe 34 connected to the pipe 30 on its way (state of G in FIG. 9).

The united refrigerant flows into the receiver tank 50 where it is divided into gas and liquid, and only the gas refrigerant flows through the pipe 31 and via the one end 73A into the refrigerant flow passage 73 of the refrigerant pipe 71 and flows through the internal heat exchanger 3. In the internal heat exchanger 3, the refrigerant gas is heat exchanged with the refrigerant on the high pressure side which has given off heat in the internal gas cooler 2 but is prior to being decompressed as described above so that the refrigerant gas is heated (state of A in FIG. 9). In this way, the overheating of the refrigerant to be sucked into the compressor 1 will be eliminated, thereby securely avoiding the occurrence of liquid back. And the refrigerant mist forms a part of the refrigerant came out of the receiver tank 50 is heated to be gas. So it can be prevented that the compression efficiency of the compressor 1 falls. Thereafter, the refrigerant is sucked through the pipe 32 into the compressor 1, and then such a cycle is repeated.

As described above, in the heating mode, the refrigerant can be evaporated in the external heat exchanger 5 without flowing the refrigerant into the evaporator 9, while in the cooling mode the refrigerant can be caused to give off the heat at the external heat exchanger 5 without flowing the refrigerant into the internal gas cooler 2. In this way, both the operations for the cooling and heating can be carried out without changing the direction of the air fed by the blower 60 by means of a deflector used in the prior art.

Figure 12:
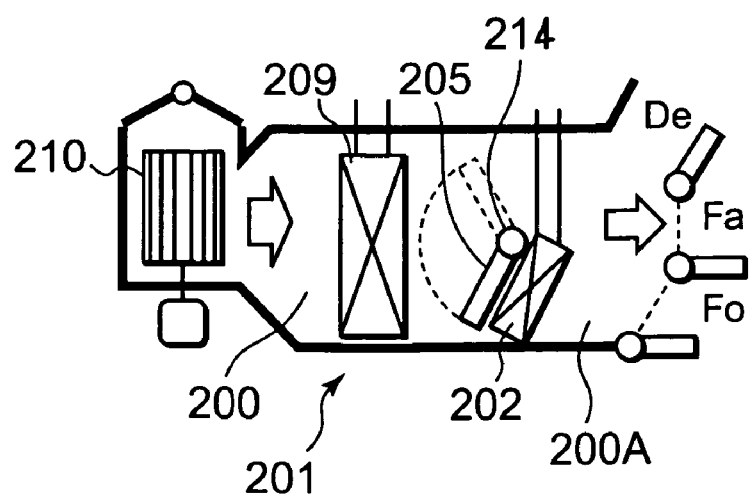
FIG. 12 is a layout view of a utilizing side heat exchanger of the car air-conditioner of FIG. 11.

That is to say, in the prior art as shown in FIG. 12, a storage room 200 includes a movable deflector 205. When the interior of a car is heated, the deflector 205 is positioned above the internal gas cooler 202 as shown in broken lines in FIG. 12 and flowing of the refrigerant into an evaporator 209 is impeded. According to this configuration, the air in the storage room 200 provided in a heat exchanging relationship with the interior of the car is heated by heat exchanging with the refrigerant in the internal gas cooler 202 so that the interior of the car can be heated by merely feeding such a heated air into the interior of the car by means of a blower 210.

Even in the case that the interior of the car is cooled, however, as the refrigerant passes through the internal gas cooler 202, the air fed to the internal gas cooler 202 by means of the blower 210 must be impeded by positioning the deflector 205 at a location on the rear surface of the internal gas cooler 202 as shown in solid lines in FIG. 12. Therefore, the space for locating the deflector 205 must be provided. In the case that a refrigerant cycle unit is used for car air-conditioning as in the embodiment of the invention, particularly, as the refrigerant cycle unit should be arranged within a limited space in an automobile, the capacity of a utilizing side heat exchanger 201 must be reduced due to such an even more limited space.

In the prior art, accordingly, the cycle efficiency of air-conditioning would be degraded significantly. In the case using carbon dioxide as a refrigerant whose pressure would become the supercritical pressure on the high pressure side, particularly, as the refrigerant gives off its heat while maintaining a gas state, temperature drop would occur in the internal gas cooler 202. Such a system has a characteristic enabling the improvement of its efficiency by providing heat exchangers of a countercurrent type in sufficient consideration of the temperature drop. However, the prior art system suffers from such a reduction in capacity so that the beneficial characteristics of the carbon dioxide refrigerant could not be sufficiently exhibited.

According to the invention, consequently, its becomes possible to carry out the cooling and heating the interior of a car without providing a deflector 205 by evaporating the refrigerant in the external heat exchanger 5 without causing the refrigerant to flow in the evaporator 9 in the heating mode, while by causing the refrigerant to give off the heat at the external heat exchanger 5 without causing the refrigerant to flow into the internal gas cooler 2 in the cooling mode. Therefore, it becomes correspondingly possible to enlarge the capacities of the internal gas cooler 2 and the evaporator 9 as utilizing side heat exchangers so that the cycle efficiency can be improved. By enlarging the heat radiation area of the internal gas cooler 2, particularly, it is also possible to bring about the beneficial characteristics of the carbon dioxide refrigerant sufficiently in the internal gas cooler 2, thereby improving the heating performance of the unit.

According to the invention, in addition, by dividing the refrigerant which has given off its heat in the internal gas cooler 2 into two flows, causing the one flow to be decompressed in the second expansion valve 8 and to flow into the evaporator 9 so as to absorb the heat therein, and causing the other flow to be decompressed in the first expansion valve 4 and to flow into the external heat exchanger 5 so as to absorb the heat therein, it is possible to condense and remove the moisture in the air in the interior of the car by lowering the temperature of the air to below dew point in the evaporator, while an amount of heat to be transferred to the internal gas cooler 2 is taken in the external heat exchanger 5 from the exterior of the car.

According to the invention, moreover, even if the refrigerant in the external heat exchanger 5 may evaporate at a pressure less than 3.5 MPa in the case that outdoor air temperature is below the freezing point, by bringing the refrigerant which has evaporated in the evaporator 9 to a predetermined constant pressure (3.5 MPa) in the constant pressure valve 10, it becomes possible to maintain the evaporating temperature of the refrigerant at the predetermined value or higher temperature. In other words, if no constant pressure valve 10 is provided and the pressure of the refrigerant which has evaporated in the evaporator 9 is used as it is, the pressure on the low pressure side will decrease so that the refrigerant flowing through the refrigerant circuit will change to a low pressure state in its entirety, with the result that there is a risk of the refrigerant being frozen in the evaporator 9.

In contrast herewith, according to the invention the refrigerant which has evaporated in the evaporator 9 is caused to pass through the constant pressure valve 10 to bring its pressure to a predetermined constant pressure (3.5 MPa) so that the evaporating temperature in the evaporator 9 can be maintained at a predetermined value or higher, for example, at 0° C. or higher, thereby previously preventing the disadvantage of freeze-up of the refrigerant.

As described in detail above, the present invention can provide a refrigerant cycle unit 20 capable of dehumidifying while effectively heating, thereby enabling the performance of the refrigerant cycle unit 20 as a whole to be even more improved.

In the present embodiment of the invention, moreover, while the internal heat exchanger 3 comprises the refrigerant pipe 71 of the double tube structure and the refrigerant pipe 70 provided in the heat exchanging relationship with the refrigerant pipe 71 and having the three integrally provided flow passages consisting of the refrigerant flow passage 72 in the refrigerant pipe 71, the flow passage 73 provided around the outer circumference of the refrigerant flow passage 72, and the refrigerant flow passage in the refrigerant pipe 70, it will be apparent that the construction of the internal heat exchanger is not limited to that of the embodiment, and may be of any construction insofar as the internal heat exchanger includes three refrigerant flow passages capable of heat exchanging with one another and having heat exchanging capabilities different from one another.

Figure 10:
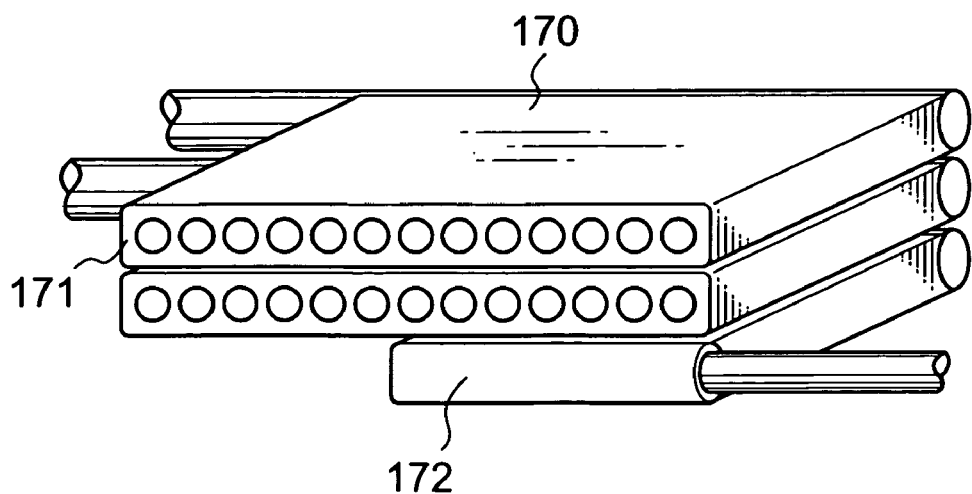
FIG. 10 is a perspective view of an internal heat exchanger of another embodiment of the invention.
Figure 11:
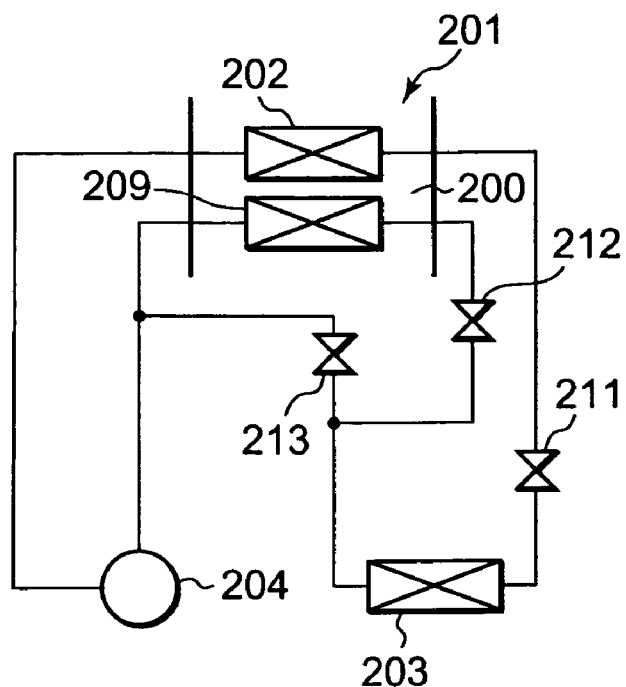
FIG. 11 is a refrigerant circuit diagram of a car air-conditioner of prior art.

That is to say, as shown in FIG. 10, two micro-tube type heat exchangers 170 and 171 having an equal heat radiating surface area and a micro-tube type heat exchanger 172 having a heat radiating surface area smaller (i.e. smaller heat exchanging capability) than those of the two heat exchangers 170 and 171 are arranged to be capable of heat exchanging with one another. Using such an internal heat exchanger thus configured, for example, a refrigerant on the low pressure side is caused to flow a refrigerant flow passage formed in the micro-tube type heat exchanger 171, and in the heating mode the refrigerant at high pressure side which has given off its heat in the internal gas cooler 2 is caused to flow in the micro-tube type heat exchanger 172 so as to be heat exchanged with the refrigerant on the low pressure side flowing through the micro-tube type heat exchanger 171, while in the cooling mode, the refrigerant on the high pressure side which has given off its heat in the external heat exchanger 5 is caused to flow through the micro-tube type heat exchanger 170 so as to be heat exchanged with the refrigerant on the lower pressure side flowing through the micro-tube type heat exchanger 171.

Moreover, although in the present embodiment of the invention, the refrigerant flow passages in the internal heat exchanger 3 for flowing the refrigerants on the high pressure side in the heating and cooling modes are changed, it is to be understood that the flow passages on the low pressure side may be changed without changing the flow passages on the high pressure side. Further, the flow-passages of both the refrigerants on the high and low pressure sides may be changed so that the heat exchanged amount of the refrigerant in the internal heat exchanger in the cooling mode may be made larger than the heat exchanged amount in the heating mode. Such a feature is also within the scope of the invention.

Moreover, although in the present embodiment of the invention, the heating mode is used for heat exchanging with air, it is to be understood that the heating mode may be used for heat exchanging to heat the brine which is used to recover the waste heat of the engine.

In the present embodiment of the invention, the refrigerant cycle unit is applied to a car air-conditioner, however, the invention is not limited to this use and it may be applicable to air-conditioners for rooms of buildings or houses.

What is claimed is:

1. A refrigerant cycle unit comprising a utilizing side heat exchanger arranged to be capable of heat exchanging with a space to be air-conditioned, a heat source side heat exchanger arranged outside the space to be air-conditioned, and a compressor for compressing and delivering a refrigerant, and using carbon dioxide as the refrigerant and pressure on high pressure side becoming possibly supercritical pressure, wherein an internal heat exchanger is provided for heat exchanging the refrigerant discharged from the utilizing side heat exchanger and the refrigerant discharged from the heat source side heat exchanger, a heating mode can be performed in which the refrigerant delivered from the compressor is caused to flow into the utilizing side heat exchanger so as to give off heat, and after the refrigerant which has given off the heat in the utilizing side heat exchanger has been decompressed, the refrigerant is caused to flow into the heat source side heat exchanger so as to absorb heat and to be returned to the compressor, and a cooling mode can be performed in which the refrigerant delivered from the compressor is caused to flow into the heat source side heat exchanger so as to give off heat, and after the refrigerant which has given off the heat in the heat source side heat exchanger has been decompressed, the refrigerant is caused to flow into the utilizing side heat exchanger so as to absorb heat and to be returned to the compressor, and wherein the heat exchanged amount of the refrigerant in the internal heat exchanger in the cooling mode is greater than the heat exchanged amount in the heating mode.

2. The refrigerant cycle unit as set forth in claim 1, wherein the internal heat exchanger integrally comprises at least three refrigerant flow passages capable of heat exchanging with one another and having heat exchanging capabilities therebetween different from one another, and at least one refrigerant of the refrigerants discharged from the utilizing side heat exchanger and the heat source side heat exchanger, respectively, is caused to flow in the different refrigerant flow passage depending upon the heating and cooling modes to vary heat exchanged amounts of the heating and cooling modes.

* * * * *